United States Patent

Hirai et al.

[11] Patent Number: 5,997,034
[45] Date of Patent: Dec. 7, 1999

[54] AIR BAG MADE OF RESIN

[75] Inventors: Kinji Hirai, Kanagawa; Hiroshi Tomita; Atsushi Tsuji, both of Shiga, all of Japan

[73] Assignee: Takata Corporation, Tokyo, Japan

[21] Appl. No.: 08/526,644

[22] Filed: Sep. 11, 1995

[30] Foreign Application Priority Data

Sep. 14, 1994 [JP] Japan .................................. 6-220159

[51] Int. Cl.$^6$ ................................................ B60R 21/20
[52] U.S. Cl. ............................................................ 280/743.1
[58] Field of Search ........................ 280/743.1, 728.1; 428/35.2

[56] References Cited

U.S. PATENT DOCUMENTS

| 5,452,914 | 9/1995 | Hirai ...................................... 280/743.1 |
| 5,505,485 | 4/1996 | Breed ..................................... 280/743.1 |
| 5,524,926 | 6/1996 | Hirai et al. ............................ 280/743.1 |

FOREIGN PATENT DOCUMENTS

| 0 489 320 | 6/1992 | European Pat. Off. . |
| 41 42 884 | 7/1992 | Germany . |
| 4-266544 | 9/1992 | Japan . |
| 1168166 | 10/1969 | United Kingdom . |

OTHER PUBLICATIONS

Patent Abstracts of Japan, vol. 95, No. 1, Feb. 28, 1995, JP–A–06 286545 (Takata KK), Oct. 11, 1994.
Japanese Industrial Standard, Testing Methods for Thermoplastic Polyurethane Elastomers, JIS K 7311–1987, UDC 678.664: 678.073: 678.074: 678.01.

*Primary Examiner*—Christopher P. Ellis
*Attorney, Agent, or Firm*—Kanesaka & Takeuchi

[57] ABSTRACT

An air bag is made of thermoplastic urethane resin. The resin has a hardness (Shore scale A) of 88 to 92 measured by JIS K-7311; a tensile strength of 400 kg/cm$^2$ or more measured by JIS K-7311; a breaking elongation of 400% or more measured by JIS K-7311; a 100% modulus of 70 kg/cm$^2$ or more measured by JIS K-7311; a 300% modulus of 150 kg/cm$^2$ or more measured by JIS k-7311; a tearing strength of 75 kg/cm or more measured by JIS K-7311; a pour point of 180° C. to 188° C. measured by Flow Tester; and a melting viscosity of $2.5 \times 10^5$ Ps/190° C. to $45 \times 10^5$ Ps/190° C. measured by Flow Tester.

4 Claims, 2 Drawing Sheets

AIR BAG MADE OF RESIN

FIELD OF THE INVENTION

The present invention relates to an air bag of an air bag device installed into a motor vehicle to protect a vehicle occupant when the vehicle comes into collision and, more particularly, to an air bag made of thermoplastic urethane resin.

DESCRIPTION OF THE RELATED ART

An air bag device for a driver (hereinafter, referred to as the "driver air bag device") installed in the center of a steering wheel comprises a retainer, an air bag attached to the retainer, a gas generator (inflator) for deploying the air bag, and a module cover for covering the air bag. When the vehicle comes into collision, the inflator generates gases and the air bag is then deployed into the vehicle cabin while breaking the module cover.

A conventional air bag used in the driver air bag is made of fabrics and has a circular front panel and a circular rear panel having a center opening into which an inflator is inserted. The front panel and the rear panel are sewn together around the peripheries thereof.

As for an air bag device for an occupant in a passenger seat (hereinafter, referred to as the "passenger air bag device") which is mounted in an instrument panel, an air bag and an inflator are installed in a container and a module cover is placed in such a way as to cover an opening of the container. The module cover is also called a "lid" or a "deployment door". In a collision of a vehicle, the inflator is actuated to deploy the air bag. The module cover is then pushed by the deploying air bag to open up into the vehicle cabin. Then, the air bag is deployed fully into the vehicle cabine.

A conventional air bag used in the passenger air bag device is also made of fabrics.

An air bag made of thermoplastic urethane resin such as thermoplastic polyurethane is disclosed in Japanese Patent Laid-Open No. 4-266544 (the asignee: BASF).

An air bag made of fabric has disadvantages of requiring more processing steps and extra cost for sewing the panels, while the air bag made of thermoplastic urethane resin disclosed in Japanese Patent Laid-Open No. 4-266544 is simple in terms of its fabrication owing to the use of fusion instead of sewing. However, the air bag made of thermoplastic urethane resin has a problem to be solved such that the air bag is not capable of being satisfactorily and quickly deployed in a wide temperature range of an extreme low degree to a high degree (for example, −40° C. to +100° C.).

OBJECT AND SUMMARY OF THE INVENTION

The object of the present invention is to solve the problem of the conventional air bag made of thermoplastic urethane resin and to provide an air bag made of thermoplastic urethane resin capable of being efficiently and quickly deployed at the ambient temperature ranging from an extreme low degree to a high degree.

In the air bag made of thermoplastic urethane resin of the present invention, the thermoplastic urethane resin has properties presented in Table 1 with the values indicated in Table 1 measured by the testing method indicated in Table 1.

TABLE 1

| items | testing method | values |
| --- | --- | --- |
| hardness (Shore scale A) | JIS K 7311 | 88–92 |
| tensile strength (kg/cm$^2$) | JIS K 7311 | 400 or more |
| breaking elongation (%) | JIS K 7311 | 400 or more |
| 100% modulus (kg/cm$^2$) | JIS K 7311 | 70 or more |
| 300% modulus (kg/cm$^2$) | JIS K 7311 | 150 or more |
| tearing strength (kg/cm) | JIS K 7311 | 75 or more |
| pour point (° C.) | Flow Tester | 182–188 |
| melting viscosity (Ps/190° C.) | Flow Tester | 2.5–45 × 10$^5$ |

It is known that thermoplastic urethane resin is preferable as a material of the air bag. However, the known thermoplastic urethane resin has the property of crystallizing at a low temperature so as to be easy to destroy and of softening at a high temperature so as to reduce its strength. Conventionally, there is no material satisfying the requirements of deploying at the ambient temperature ranging from −40° C. to +100° C. After various examinations with regard to thermoplastic urethane resin, the inventors have accomplished this invention upon discovering that the air bag made of the thermoplastic urethane resin having the aforementioned properties satisfactorily quickly deploys in a wide temperature range of −40° C. to +100° C.

In the air bag made of thermoplastic urethane resin of the present invention, the resin having Shore scale A hardness of less than 88 is not unable to provide satisfactory efficiency at a high temperature, while the resin having Shore scale A hardness of more than 92 makes the air bag too hard to be folded and is then unable to provide satisfactory efficient at a low temperature.

The resin having tensile strength of less than 400 kg/cm$^2$ is unable to provide satisfactory strength at a high temperature so that the air bag of this resin breaks during deploying at a high temperature.

The resin having breaking elongation, one of indications for the fragility of the film, of less than 400% easily allows the film to break at a low temperature so that the air bag of the resin is unable to withstand the deployment at a low temperature.

The resin having 100% modulus of less than 70 kg/cm$^2$ is unable to allow the air bag to hold the necessary inner presser, so that the air bag of this resin can not receive the occupant.

The resin having 300% modulus of less than 150 kg/cm$^2$ allows the air bag to be elongated during the deployment at a high temperature, so that the deployment configuration is quite disorganized. Therefore, it is not preferable.

The resin having tearing strength of less than 75 kg/cm easily allows the air bag to break during the deployment.

The resin having a pour point of less than 182° C. is unable to provide satisfactory efficiency at low and high temperatures, while the resin having pour point of more than 188° C. makes the hardness high and is then unable to provide satisfactory efficiency at a low temperature.

The resin having melting viscosity of less than 2.5×10$^5$ Ps/200° C. is unable to provide satisfactory efficiency at low and high temperatures, while the resin having melting viscosity of more than 45×10$^5$ Ps/200° C. makes the hardness high and is then unable to provide satisfactory efficiency at a low temperature. In the above description, the high temperature means from +80° C. to +100° C. and the low temperature means from −40° C. to −30° C.

The air bag of the present invention is preferably manufactured upon making a film or sheet from thermoplastic urethane resin pellet having properties indicated in Table 2 by T-die extrusion or manufactured by blow molding.

TABLE 2

| items | testing method | values |
|---|---|---|
| hardness (Shore scale A) | JIS K 7311 | 89–93 |
| tensile strength (kg/cm²) | JIS K 7311 | 300 or more |
| breaking elongation (%) | JIS K 7311 | 400 or more |
| 100% modulus (kg/cm²) | JIS K 7311 | 75 or more |
| 300% modulus (kg/cm²) | JIS K 7311 | 140 or more |
| tearing strength (kg/cm) | JIS K 7311 | 90 or more |
| pour point (° C.) | Flow Tester | 192–198 |
| melting viscosity (Ps/200° C.) | Flow Tester | $2.5-25 \times 10^5$ |

DESCRIPTION OF THE PREFERRED EMBODIMENTS

Hereinafter, embodiments of the present invention will be described in detail with reference to the attached drawings.

Figure 1:
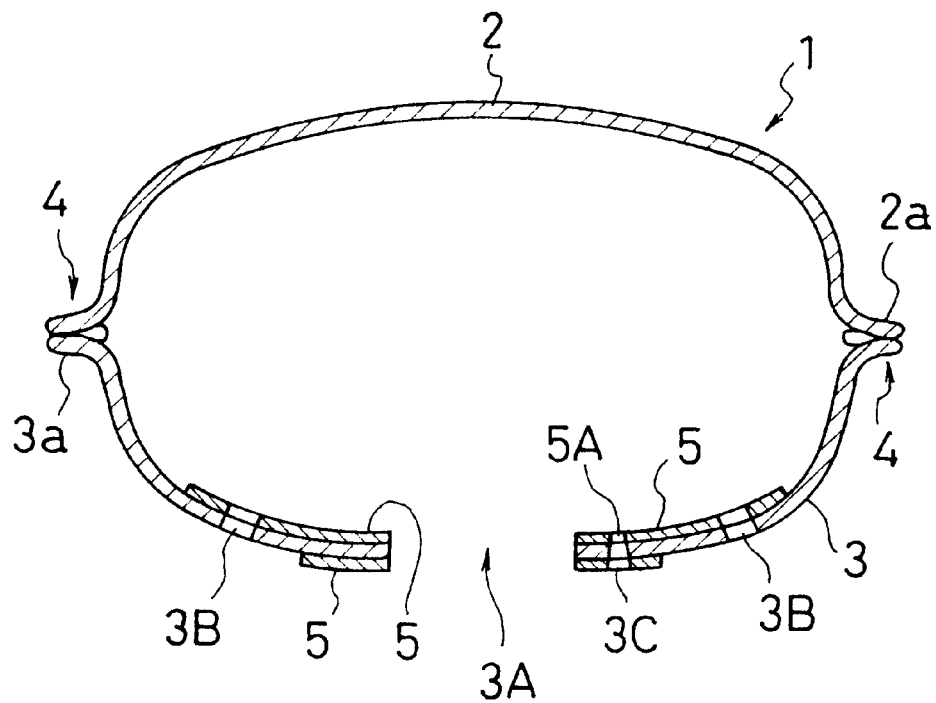
FIG. 1 is a sectional view showing an embodiment of an enlarged driver air bag to which the present invention is applied.
Figure 2:
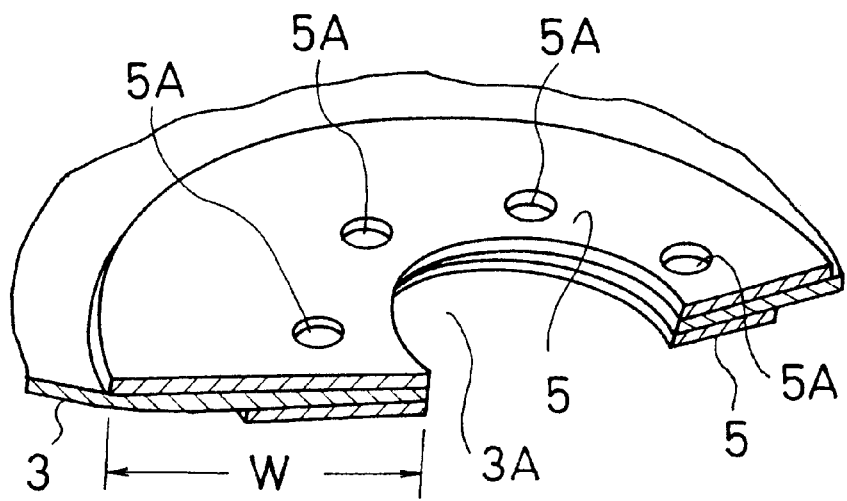
FIG. 2 is a perspective sectional view with main parts of the driver air bag of FIG. 1.
Figure 3:
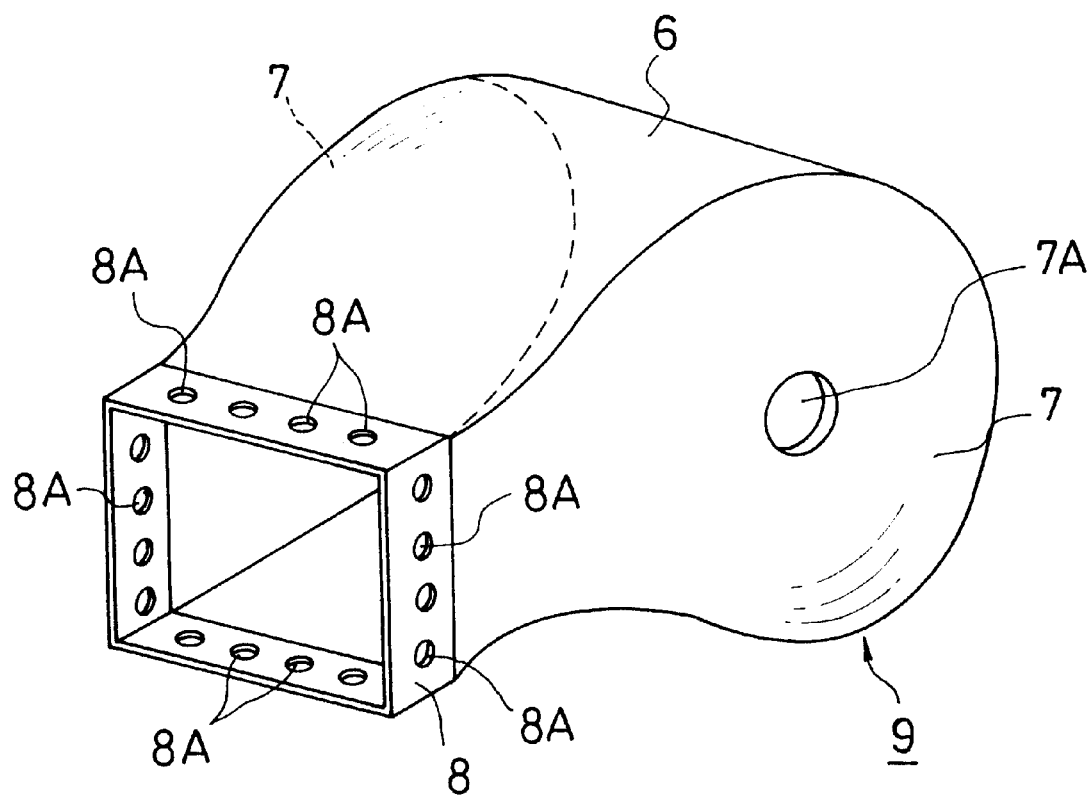
FIG. 3 is a perspective view showing an embodiment of a passenger air bag to which the present invention is applied.

FIG. 1 is a sectional view showing an embodiment of a driver air bag to which the present invention is applied, and FIG. 2 is a perspective sectional view with the main parts of the driver air bag. FIG. 3 is a perspective view showing an embodiment of a passenger air bag to which the present invention is applied.

The driver air bag 1 shown in FIGS. 1 and 2 is made of thermoplastic urethane resin films and comprises a circular front panel 2 and a circular rear panel 3 having a central opening 3A into which an inflator (not shown) is inserted. The periphery 2a of the front panel 2 and the periphery 3a of the rear panel 3 are fused together (reference numeral 4 designates the fused part in FIG. 1). Around the periphery of the opening 3A of the rear panel 3, films 5 made of polyimide resin having higher heat resistance than thermoplastic urethane resin are fused to the outer surface and the inner surface of the rear panel 3. The method used for fusing may be heat sealing, impulse sealing, or high-frequency sealing.

In FIGS. 1 and 2, reference numeral 3B designates vent holes, and 5A and 3C designate fixing holes formed in the films 5 and the rear panel 3 for attaching the air bag to the inflator (not shown).

The highly heat-resistant film which is attached to the inner surface of the rear panel around the periphery of the opening may be silicone resin, fluoro resin such as PFA, polyphenylenesulfide resin, polyamideimide resin, aramid resin, polyparabanic acid resin, polysulfone resin, amorphous polyallylate resin, polyethersulfone resin, polyetherimide resin, polyethylenenaphthalate resin, polyetherketone resin, as well as polyimide resin. The optimum thickness and outside diameter of this type of film depends on the performance of the employed inflator and the physical properties of the film (particularly the pour point and the tearing strength). Usually, it is preferable that the thickness is in a range of 0.02 to 0.1 mm and the width W as shown in FIG. 2 is in a range of 50 to 200 mm.

It should be understood that the resin air bag of the present invention is not limited to be applied to a driver air bag device and may be applied to a passenger air bag device, like a passenger air bag 9 comprising a center panel 6, side panels 7, and an attachment 8 for a container (not shown). Reference numeral 7A designates a vent hole, and 8A designates fixing holes for attaching the passenger air bag 9 to the container. It should be noted that the passenger air bag 9 is also easily manufactured by fusing the center panel 6 with the side panels 7.

The aforementioned air bags are manufactured upon making a film or sheet of resin by T-die extrusion, then cutting the film or sheet into predetermined configurations and fusing the cut films or sheets.

The resin air bag of the present invention may be formed by blow molding.

However, it needs special attention to form the air bag by blow molding from thermoplastic urethane resin having properties indicated in Table 1. Because the thermoplastic urethane resin with the properties of Table 2 has hygroscopicity, the dry environment is necessary to perform extrusion of the thermoplastic urethane resin. Particularly in case of blow molding, the reduced degree of viscosity due to the moisture in the resin easily causes draw down. To prevent the draw down, it is preferable that the resin pellets are dried more than 2 hours at 80° C.

In normal blow molding, an accumulator head is employed in parison molding. However, since the resin with the properties of Table 2 is easily deteriorated by heat in the accumulator, a direct blowing machine or an injection molding machine is preferably employed.

To prevent the deterioration while efficiently melting and kneading the resin, the L/D of the extruding machine is preferably between 20 and 26 and the compression ratio is preferably between 3.0 and 3.5. The temperature of the resin extruded from the head is preferably its pour point +10° C. or less. The higher temperature of the resin easily causes draw down, thereby making the molding impossible. The blowing pressure is preferably between 290 and 590 kPa. The temperature of the mold is preferably between 20 and 60° C. The lower temperature of the mold easily produces mottles while the higher temperature easily makes the resin adhere to the mold. The air bag formed by the blow molding as mentioned above is characterized in that there is no reduced strength due to the sealed portion of the air bag formed by heat sealing and no different thickness around the periphery of the sealed portion.

Turning to some embodiments, the present invention will now be described in more detail.

(Embodiments 1–3, Comparative Examples 1–9)

Driver air bags as shown in FIG. 1 were made of thermoplastic urethane resin films having properties indicated in Table 1, respectively, by heat sealing. Each of the driver air bags was provided with, as the highly heat-resistant film, a polyimide resin film having a thickness of 0.1 mm and a wide of 200 mm attached on the inner surface of the air bag and a polyimide resin film having a wide of 50 attached on the outer surface of the air bag.

The results of inflation tests with the respective air bags thus formed are presented in Table 4. In this table, mark "E" indicates a large breakage, "F" indicates a small breakage, and "G" indicates no breakage.

As seen from Table 3, in the air bags of the present invention, the breakage is securely prevented in a wide temperature range of −40° C. to +100° C.

As described above, the present invention can provide an air bag made of thermoplastic urethane resin which is capable of efficiently protecting the occupant in the wide temperature rang of an extreme low degree to a high degree as −40° C. to +100° C.

TABLE 3

| examples | No. | hardness JIS-A | tensile strength kg/cm$^2$ | breaking elongation % | 100% modulus kg/cm$^2$ | 300% modulus kg/cm$^2$ | tearing strength kg/cm | pour point °C. | melting viscosity Ps/190° C. | inflation test −40° C. | −30° C. | 80° C. | 90° C. | 100° C. |
|---|---|---|---|---|---|---|---|---|---|---|---|---|---|---|
| C.E. 1 | 1 | 94 | 740 | 435 | 127 | 360 | 114 | 177 | 1.5 × 10$^5$ | E | E | E | E | E |
| C.E. 2 | 2 | 97 | 517 | 389 | 151 | 362 | 126 | 189 | 28 × 10$^5$ | E | E | G | G | E |
| C.E. 3 | 3 | 98 | 552 | 498 | 151 | 274 | 130 | 176 | 1.0 × 10$^5$ | E | E | E | E | E |
| C.E. 4 | 4 | 86 | 618 | 499 | 85 | 164 | 96 | 170 | 0.3 × 10$^5$ | F | G | E | E | E |
| C.E. 5 | 5 | 89 | 662 | 401 | 104 | 337 | 82 | 172 | 0.7 × 10$^5$ | E | E | F | E | E |
| C.E. 6 | 6 | 87 | 596 | 484 | 74 | 161 | 80 | 173 | 0.7 × 10$^5$ | F | G | E | E | E |
| C.E. 7 | 7 | 82 | 598 | 565 | 54 | 100 | 74 | 170 | 0.2 × 10$^5$ | E | E | E | E | E |
| C.E. 8 | 8 | 89 | 637 | 477 | 87 | 198 | 87 | 171 | 0.4 × 10$^5$ | E | G | G | E | E |
| C.E. 9 | 9 | 93 | 625 | 409 | 122 | 287 | 115 | 190 | 30 × 10$^5$ | E | G | G | E | E |
| EMB 1 | 10 | 90 | 683 | 425 | 104 | 255 | 96 | 188 | 14 × 10$^5$ | G | G | G | G | G |
| EMB 2 | 11 | 88 | 625 | 464 | 84 | 192 | 86 | 182 | 2.5 × 10$^5$ | G | G | G | G | G |
| EMB 3 | 12 | 90 | 647 | 441 | 97 | 222 | 84 | 183 | 5.5 × 10$^5$ | G | G | G | G | G |

C.E. = Comparative Example
EMB = Embodiment
E = large breakage,
F = small breakage,
G = no breakage

What we claim is:

1. An air bag made of thermoplastic urethane resin, wherein said thermoplastic urethane resin has
   a hardness (Shore scale A) of 88 to 92 measured by JIS K-7311,
   a tensile strength of 400 kg/cm$^2$ or more measured by JIS K-7311,
   a breaking elongation of 400% or more measured by JIS K-7311,
   a 100% modulus of 70 kg/cm$^2$ or more measured by JIS K-7311,
   a 300% modulus of 150 kg/cm$^2$ or more measured by JIS K-7311,
   a tearing strength of 75 kg/cm or more measured by JIS K-7311
   a pour point of 182° C. to 188° C. measured by Flow Tester, and
   a melting viscosity of 2.5×10$^5$ Ps/190° C. to 45×10$^5$ Ps/190° C. measured by Flow Tester.

2. An air bag according to claim 1, wherein said air bag includes a front panel and a rear panel having an opening adapted to attach an inflator therein, said front and rear panels being made of the thermoplastic urethane resin and fixed together at outer peripheries.

3. An air bag according to claim 2, wherein said air bag further includes films attached to outer and inner surfaces of the rear panel around the opening, said films being made of polyimide resin having heat resistance higher than the thermoplastic urethane resin.

4. An air bag according to claim 1, wherein said air bag includes a center panel and side panels fixed to the center panel, said center and side panels defining an opening adapted to attach an inflator therein, said center and side panels being made of the thermoplastic urethane resin.

* * * * *